United States Patent
Kumazaki et al.

(10) Patent No.: US 8,376,459 B2
(45) Date of Patent: Feb. 19, 2013

(54) VEHICLE SEAT

(75) Inventors: Yoshiyuki Kumazaki, Aichi-ken (JP); Keisuke Hoshino, Nissin (JP); Yasuo Suzuki, Aichi-ken (JP)

(73) Assignee: Toyota Boshoku Kabushiki Kaisha, Aichi-ken (JP)

( * ) Notice: Subject to any disclaimer, the term of this patent is extended or adjusted under 35 U.S.C. 154(b) by 368 days.

(21) Appl. No.: 12/745,714

(22) PCT Filed: Aug. 1, 2008

(86) PCT No.: PCT/JP2008/063880
§ 371 (c)(1),
(2), (4) Date: Jun. 2, 2010

(87) PCT Pub. No.: WO2009/072321
PCT Pub. Date: Jun. 11, 2009

(65) Prior Publication Data
US 2010/0244524 A1    Sep. 30, 2010

(30) Foreign Application Priority Data
Dec. 3, 2007 (JP) ................................. 2007-312280

(51) Int. Cl.
*B60N 2/06* (2006.01)
(52) U.S. Cl. .................................. 297/341; 297/378.12
(58) Field of Classification Search .................. 297/341, 297/378.12
See application file for complete search history.

(56) References Cited

U.S. PATENT DOCUMENTS

| 6,152,533 | A | 11/2000 | Smuk |
| 7,014,263 | B2 * | 3/2006 | Mukoujima et al. ......... 297/341 |
| 7,517,022 | B2 * | 4/2009 | Habedank et al. ....... 297/378.12 |
| 2008/0073960 | A1 * | 3/2008 | Nakaya et al. ................ 297/341 |
| 2009/0315378 | A1 | 12/2009 | Kumazaki et al. |
| 2010/0013289 | A1 | 1/2010 | Kumazaki et al. |
| 2010/0133871 | A1 | 6/2010 | Matsumoto et al. |

FOREIGN PATENT DOCUMENTS

| DE | 102004042038 | 3/2006 |
| EP | 0 938 997 A2 | 9/1999 |
| JP | 11-244082 | 9/1999 |
| JP | 2002-360368 | 12/2002 |
| JP | 2003-341392 | 12/2003 |
| JP | 2005-280501 | 10/2005 |
| JP | 2005-312891 | 11/2005 |

OTHER PUBLICATIONS

Yoshiyuki Kumazaki et al., "Vehicle Seat Reclining Device", 12/739,036, Apr. 2010, PP.
Germany Office action, mail date is Nov. 21, 2012.

\* cited by examiner

*Primary Examiner* — Anthony D Barfield
(74) *Attorney, Agent, or Firm* — Greenblum & Bernstein, P.L.C.

(57) ABSTRACT

When a tilt-down function is performed, a rotationally-preventing condition of a reclining device connecting a base member and an intermediate member is released, so that a seat back is tiltably rotated forwardly integrally with the intermediate member and a seat cushion is pushed by a boomerang link capable of moving with the intermediate member so as to be sunk downwardly while tiltably rotating a front link. However, when a walk-in function is performed, a rotationally-preventing condition of a memory device connecting the seat back and the intermediate member is released, so that the seat back can be tiltably rotated to a forwardly inclined position independently of the intermediate member that is maintained in a condition in which the intermediate member is integrated with the base member.

3 Claims, 15 Drawing Sheets

VEHICLE SEAT

TECHNICAL FIELD

The present invention relates to a vehicle seat. More particularly, the present invention relates to a vehicle seat having a tilt-down function to sink down a seat cushion in conjunction with farthest tilting motion in which a seat back is tilted down forwardly and having a walk-in function to make a condition in which a seat body is capable of sliding forwardly relative to a vehicle floor in conjunction with half tilting motion in which the seat back is tilted to a forwardly inclined position.

BACKGROUND ART

Conventionally known is a vehicle seat having a walk-in function that is capable of widening a getting in/out space positioned behind the seat and having a tilt-down function that is capable of compactly folding down the whole seat. Further, U.S. Pat. No. 6,152,533 teaches a vehicle seat having the walk-in function and the tilt-down function described above.

In this disclosure, the vehicle seat is constructed such that when an operation for the walk-in function is performed, a seat back is tilted to a forwardly inclined position, and a slide-lock condition of a seat body relative to a vehicle floor is released, so that a condition in which the whole seat is capable of sliding forwardly can be obtained. Further, the vehicle seat is constructed such that when an operation for the tilt-down function is performed, the seat back is widely tilted forwardly, and a seat cushion is sunk downwardly, so that a tilt-down space of the seat back can be obtained.

In particular, the seat cushion is rotatably connected to the seat back via link members, so as to be sunk forwardly and downwardly due to link motion of the link members that can be operated with the forwardly tiltable rotation of the seat back.

In the conventional art described above, because the seat back and the seat cushion are linked to each other, the seat cushion is moved forwardly even when the walk-in function is performed. Therefore, a retracting space which allows the whole seat to slide forwardly can be narrowed. As a result, a getting in/out space formed behind the seat can be narrowed.

Thus, there is a need in the art to ensure a wide retracting space which allows a seat body of a vehicle seat having a walk-in function and a tilt-down function to move forwardly when the walk-in function is performed.

SUMMARY OF THE INVENTION

A vehicle seat of the present invention has a tilt-down function to sink down a seat cushion in conjunction with farthest tilting motion in which a seat back is tilted down forwardly and has a walk-in function to make a condition in which a seat body is capable of sliding forwardly relative to a vehicle floor in conjunction with half tilting motion in which the seat back is tilted to a forwardly inclined position. The seat back is connected to a base member, that is slidably disposed on a vehicle floor, via first and second rotation preventing devices while an intermediate member is interleaved thererebetween, so as to be capable of rotating relative to both of the intermediate member and the base member about a common axis and to be capable of being prevented from rotating relative thereto. A first link integrally connected to the seat cushion is rotatably connected to the intermediate member via a shaft. A second link is disposed between the seat cushion and the base member in order to rotatably connect the same by link coupling. When the tilt-down function is performed, a rotationally-preventing condition of one rotation preventing device connecting the base member and the intermediate member is released, so that the seat back is rotated and tilted forwardly integrally with the intermediate member and that the seat cushion is pushed by the first link capable of moving with the intermediate member so as to be sunk downwardly while tiltably rotating the second link. However, when the walk-in function is performed, a rotationally-preventing condition of the other rotation preventing device connecting the seat back and the intermediate member is released, so that the seat back can be tiltably rotated to the forwardly inclined position independently of the intermediate member that is maintained in a condition in which the intermediate member is integrated with the base member. The other rotation preventing device, that is capable of being released when the walk-in function is performed, is disposed on an outside position of the intermediate member in a radial direction thereof, so as to prevent the seat back from rotating relative to the intermediate member when an engagement/disengagement member connected to the seat back enters and engage a depressed portion formed in an outer circumferential peripheral portion of the intermediate member from outside in the radial direction.

According to the structure of the present invention, the seat cushion is connected to the intermediate member via the first link, so as to be sunk downwardly in conjunction with the motion in which the intermediate member rotates with the seat back when the tilt-down function is performed. However, when the walk-in function is performed, the seat back is tiltably rotated forwardly independently of the intermediate member while the intermediate member is maintained in a condition in which it is integrated with the base member. Therefore, in this case, because the seat cushion cannot be moved, a retracting space which allows the seat body to slide forwardly can be maintained without being narrowed. Thus, because the seat cushion cannot be moved when the walk-in function is performed, a wider retracting space which allows the seat body to move forwardly can be obtained in comparison with a structure in which the seat cushion can be moved forwardly as when a tilt-down operation is performed. Further, in the other rotation preventing device that connects the seat back to the intermediate member while the seat back can be maintained in the condition in which it is prevented from rotating relative to the intermediate member, the engagement/disengagement member connected to the seat back is radially aligned with the depressed portion formed in an outer circumferential peripheral portion of the intermediate member, so as to enter the depressed portion from outside in the radial direction or to be disengaged therefrom. Therefore, the other rotation preventing device can be compactly disposed in a direction of a rotational axis thereof Further, the present invention can be constructed as follows. That is, the engagement/disengagement member constituting the other rotation preventing device is arranged to be capable of moving toward and away from the seat back so as to be capable of being engaged with and disengaged from the depressed portion of the intermediate member. When the engagement/disengagement member is positioned in an engagement condition in which the engagement/disengagement member enters the depressed portion of the inner intermediate member, a pusher member rotatably connected to the seat back is pressed onto a rear surface of the engagement/disengagement member by biasing, so that the engagement/disengagement member can be pressed into the depressed portion of the inner intermediate member and can be prevented from being disengaged therefrom.

According to the structure of the present invention, when the engagement/disengagement member is in the engagement condition in which it enters and engages the depressed portion of the intermediate member, the pusher member that is rotatably attached to the seat back presses the engagement/disengagement member from a rear surface side thereof by rotational biasing. As a result, the engagement/disengagement member is positioned in a condition in which it is pressed into the depressed portion of the intermediate member, so as to be prevented from being disengaged therefrom. Thus, an engagement strength between the engagement/disengagement member and the intermediate member can be increased, so that a rotation preventing strength of the other rotation preventing device can be increased.

Further, the present invention can be constructed as follows. That is, when the walk-in function is performed, the engagement condition of the engagement/disengagement member with the depressed portion of the inner intermediate member can be released, so that the disengaged engagement/disengagement member can slide along a curved outer circumferential surface portion of the intermediate member as the seat back is tiltably rotated. Further, as the seat back is raised from the forwardly inclined position, the engagement/disengagement member can be returned to a position in which the engagement/disengagement member is capable of entering the depressed portion of the inner intermediate member, so as to enter the depressed portion of the intermediate member while being pressed from a rear surface side thereof by the pusher member, thereby being shifted to the engagement condition.

According to the structure of the present invention, the engagement/disengagement member, that is disengaged from the depressed portion of the intermediate member as a result of performance of the walk-in function, can slide along a curved outer circumferential surface portion of the intermediate member as the seat back is tiltably rotated. Therefore, even if the engagement/disengagement member is not maintained in a condition in which it is spaced from the outer circumferential surface portion of the intermediate member, the engagement/disengagement member can smoothly move as the seat back is tiltably rotated.

BEST MODE FOR CARRYING OUT THE INVENTION

In the following, the best mode for carrying out the invention will be described with reference to the drawings.

Embodiment 1

Figure 1:
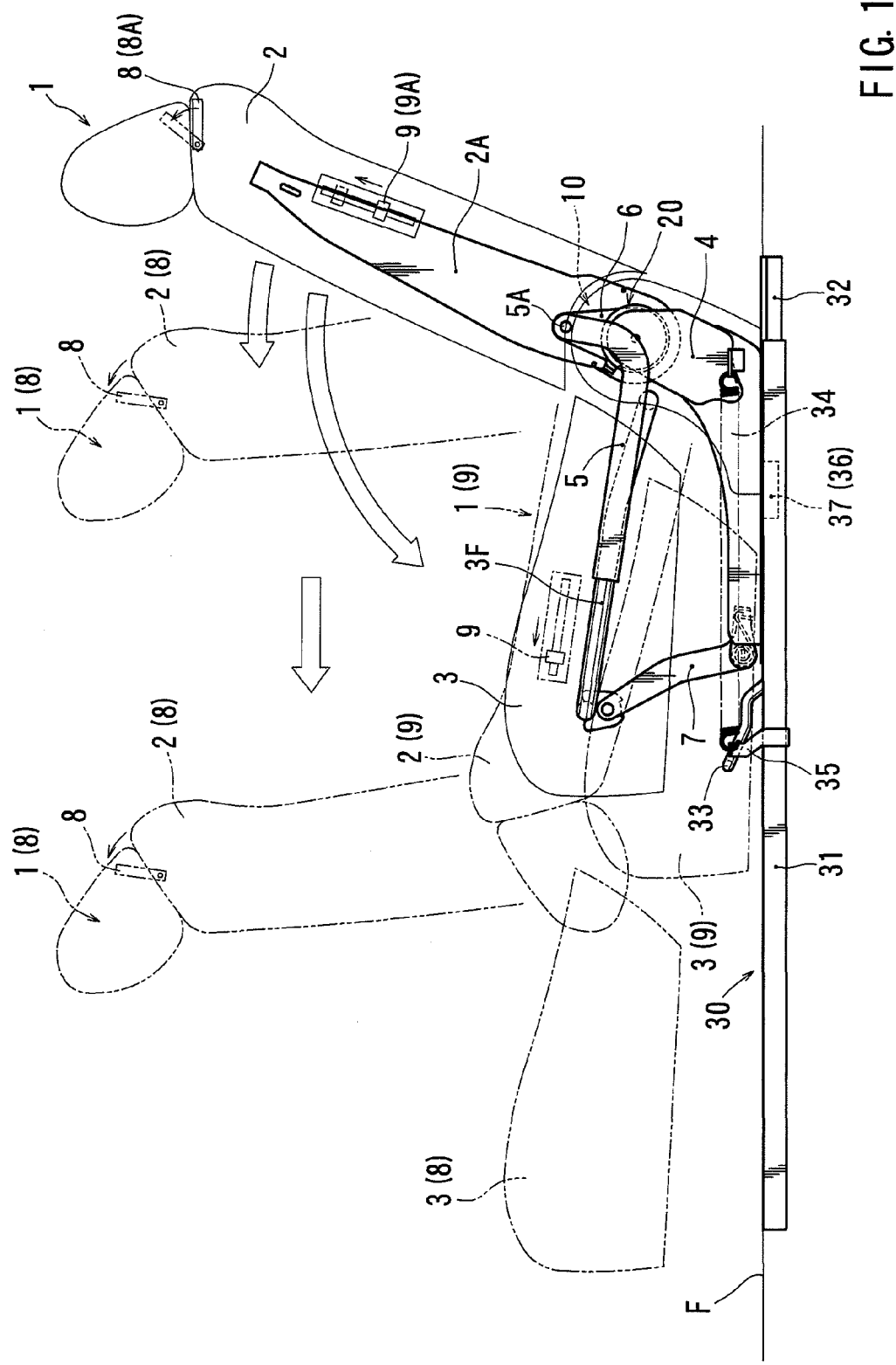
FIG. 1 is a side view, which schematically illustrates a structure of a vehicle seat according to Embodiment 1.

First, a structure of a vehicle seat of Embodiment 1 will be described with reference to FIGS. 1 to 15. FIG. 1 shows a schematic structure of the vehicle seat of the present embodiment. The vehicle seat includes a seat body 1 as a sitting portion. The seat body 1 is composed of a seat back 2 as a backrest and a seat cushion 3 as a sitting portion. The seat back 2 and the seat cushion 3 are respectively connected to and supported on a base member 4 that is slidably disposed on a vehicle floor F.

Figure 2:
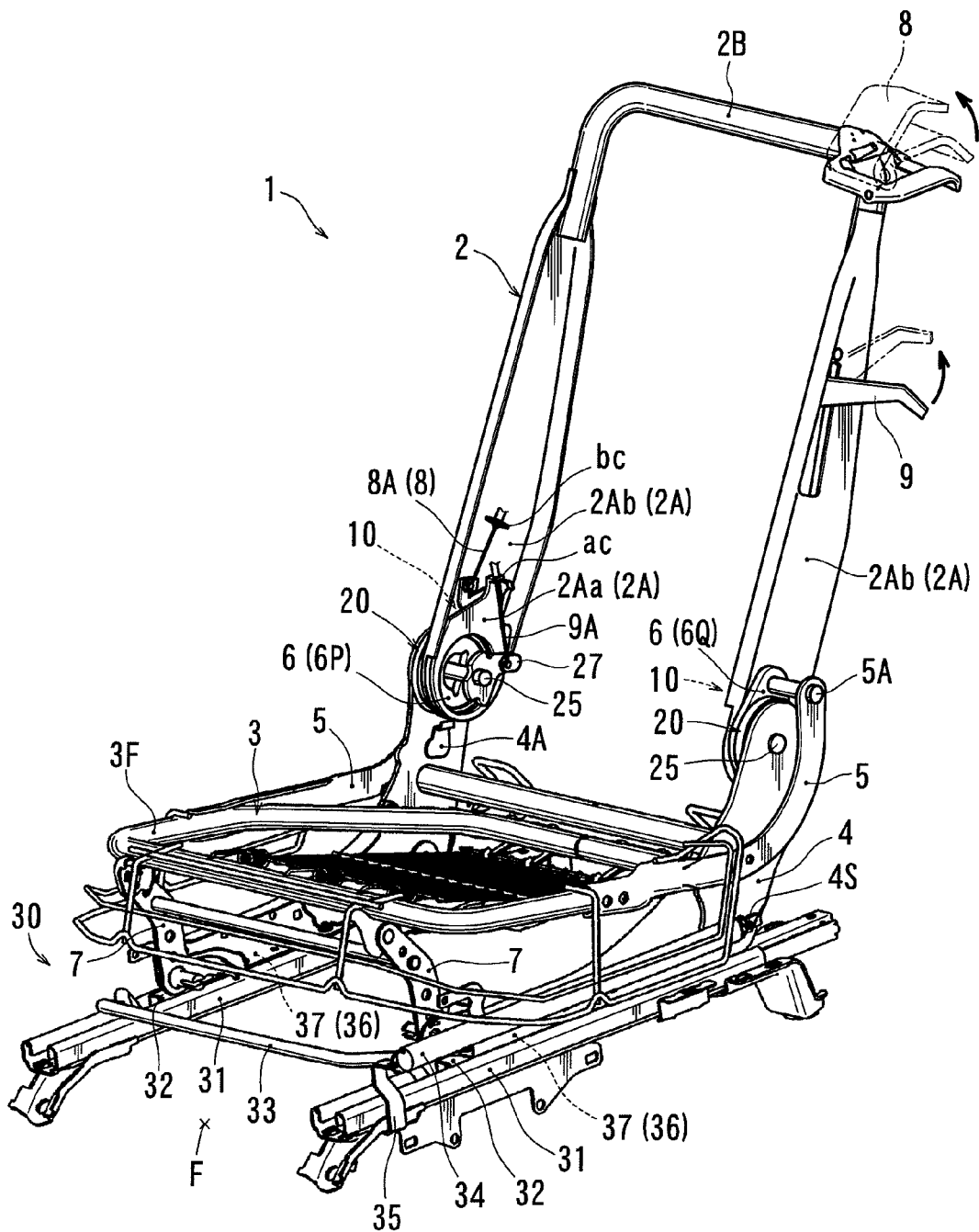
FIG. 2 is a perspective view, which illustrates an inner structure of a seat body.

In particular, as shown in FIG. 2, the base member 4 is connected to the floor F via a slider device 30, so as to be slidable relative to the floor F in a vehicle longitudinal direction. The slider device 30 is normally maintained in a condition in which sliding motion thereof is locked, so that a slide position of the base member 4 (the seat body 1) relative to the floor F is can fixed.

Further, the slider device 30 includes a pair of right and left lower rails 31 and 31 that are integrally connected to the floor F, and a pair of right and left upper rails 32 and 32 that are respectively longitudinally slidably coupled to the lower rails 31 and 31. The upper rails 32 and 32 are respectively integrally affixed to lower surface portions of right and left sides of the base member 4, so as to slide the base member 4 (the seat body 1) relative to the floor F due to cooperative sliding motion thereof relative to the lower rails 31 and 31.

The upper rails 32 and 32 respectively have slide lock mechanisms 37 and 37 that are capable of locking the sliding motion of the upper rails 32 and 32 by engaging the lower rails 31 and 31. The slide lock mechanisms 37 and 37 are respectively normally biased and maintained in locked conditions in which they engage the lower rails 31 and 31, thereby locking the sliding motion of the upper rails 32 and 32. Further, each of the slide lock mechanisms 37 and 37 is connected to an operation lever 33 that is extended forwardly therefrom, so that the slide lock condition described above can be released when the operation lever 33 is lifted up.

Figure 6:
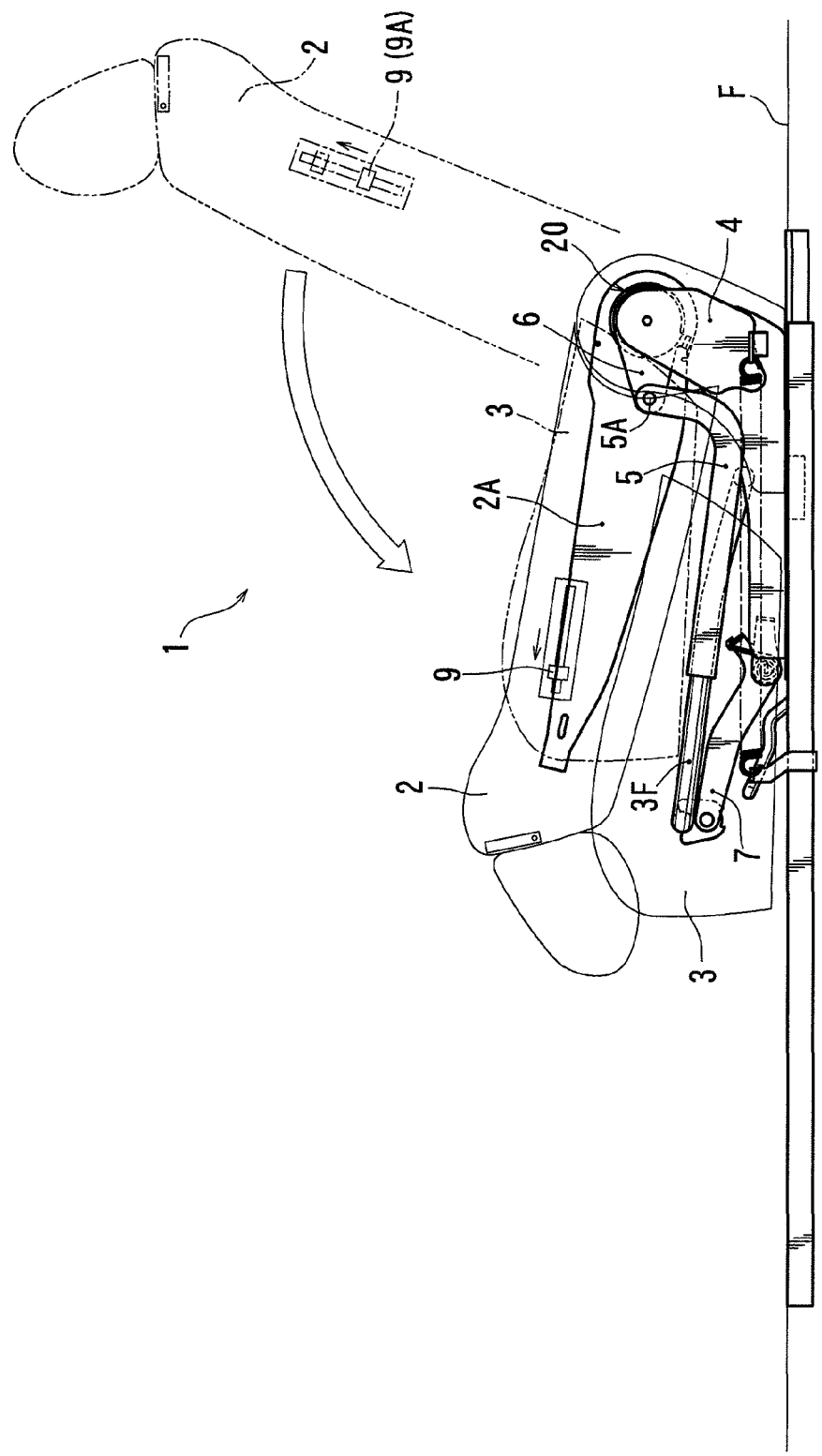
FIG. 6 is an explanatory view, which illustrates the seat body after the tilt-down operation is performed.

Now, with reference to FIG. 1 again, the vehicle seat of the present embodiment has a tilt-down function that is capable of compactly folding down the seat body 1 onto the floor F, and a walk-in function that is capable of making the seat body 1 to a posture in which the seat back 2 is inclined forwardly and is capable of sliding the seat body 1 forwardly so as to widen a getting in/out space formed therebehind. As shown in FIG. 6, the former tilt-down function can be performed by lifting up a tilt-down operation lever 9 that is disposed on a side of a shoulder portion of the seat back 2. Upon lifting up of the tilt-down operation lever 9, the seat cushion 3 is sunk downwardly in conjunction with farthest tilting motion in which the seat back 2 is tilted down forwardly, so that the seat body 1 can be compactly folded down onto the floor F.

Figure 9:
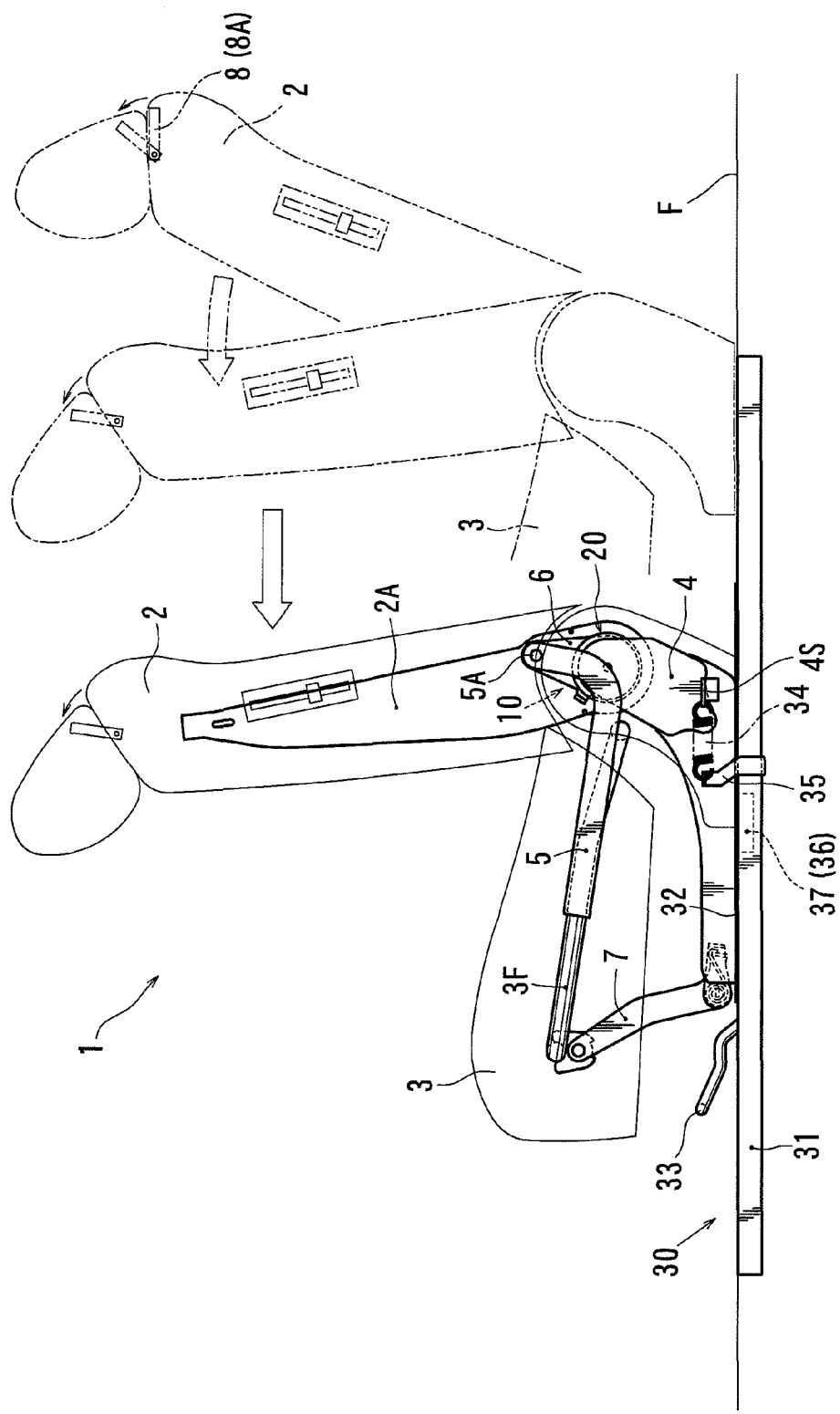
FIG. 9 is an explanatory view, which illustrates the seat body after the walk-in operation is performed.

Conversely, as shown in FIG. 9, the latter walk-in function can be performed by forwardly rotating a walk-in operation lever 8 that is disposed on a top of the shoulder portion of the seat back 2. Upon rotation of the walk-in operation lever 8, the slide lock condition of the slider device 30 described above can be released in conjunction with half tilting motion in which the seat back 2 is tilted to a forwardly inclined position, so that the seat body 1 can be slid and retracted forwardly while the seat body 1 is made to the posture in which the seat back 2 is inclined forwardly.

Operative mechanisms of the tilt-down function and the walk-in function described above will be hereinafter described in detail. First, a basic structure of the seat body 1 is described. As shown in FIG. 2, the seat back 2 constituting the backrest of the seat body 1 includes an inner framework that is constructed of plate-shaped side frames 2A and 2A extending along right and left side peripheries thereof, and an inverted U-shaped tubular curved upper frame 2B that connects upper end portions of the side frames 2A and 2A. Further, in the seat back 2, lower portions of the right and left side frames 2A and 2A are respectively rotatably hinge-connected to upper portions of right and left sides of the base member 4 via reclining devices 20 and 20 and are supported thereon.

Each of the reclining devices 20 and 20 corresponds to one rotation preventing device of the present invention. Further, in the vehicle seat of the present embodiment, a right half of the seat body 1 has the substantially same frame shapes and various additional structures as the left half thereof unless otherwise described. Therefore, in the following description, the structure of either one of the right and left halves of the seat body 1 may be representatively described with identified by reference numerals.

Figure 3:
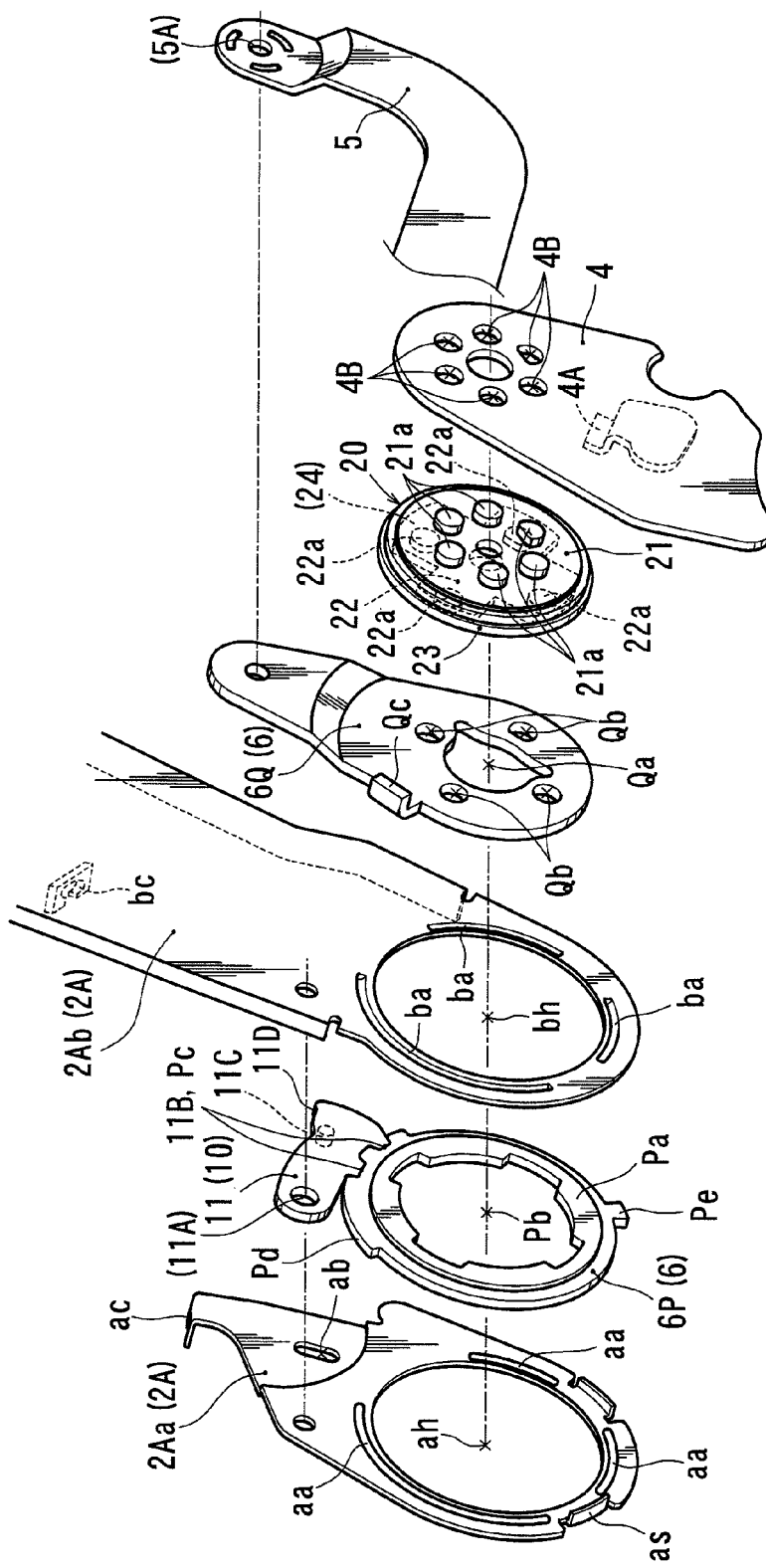
FIG. 3 is an exploded perspective view, which illustrates a connecting structure of a seat back and a base member.

FIG. 3 shows an exploded perspective view, which illustrates a connecting structure of one side frame 2A (one positioned at the right side in FIG. 2) of the seat back 2 and the base member 4. As shown in the drawing, the side frame 2A of the seat back 2 has a double layer structure in which a plate-shaped inner side frame 2Aa and a plate-shaped outer side frame 2Ab are integrally coupled to each other in a thickness direction. The side frame 2A is rotatably connected to the base member 4 via the reclining device 20 while an intermediate member 6 (an outer intermediate member 6Q) is interleaved therebetween.

The intermediate member 6 is constructed of a ring-shaped inner intermediate member 6P and an elongated plate-shaped outer intermediate member 6Q that are coupled to each other in a thickness direction and are connected to each other by welding. In particular, the inner intermediate member 6P is formed by die-cutting a steel sheet into a ring shape. Further, a cylindrically projected cylindrical portion Pa is formed between an outer circumferential peripheral portion and a central portion of the inner intermediate member 6P by half die-cutting the outer circumferential peripheral portion in a thickness direction relative to the central portion.

Figure 10:
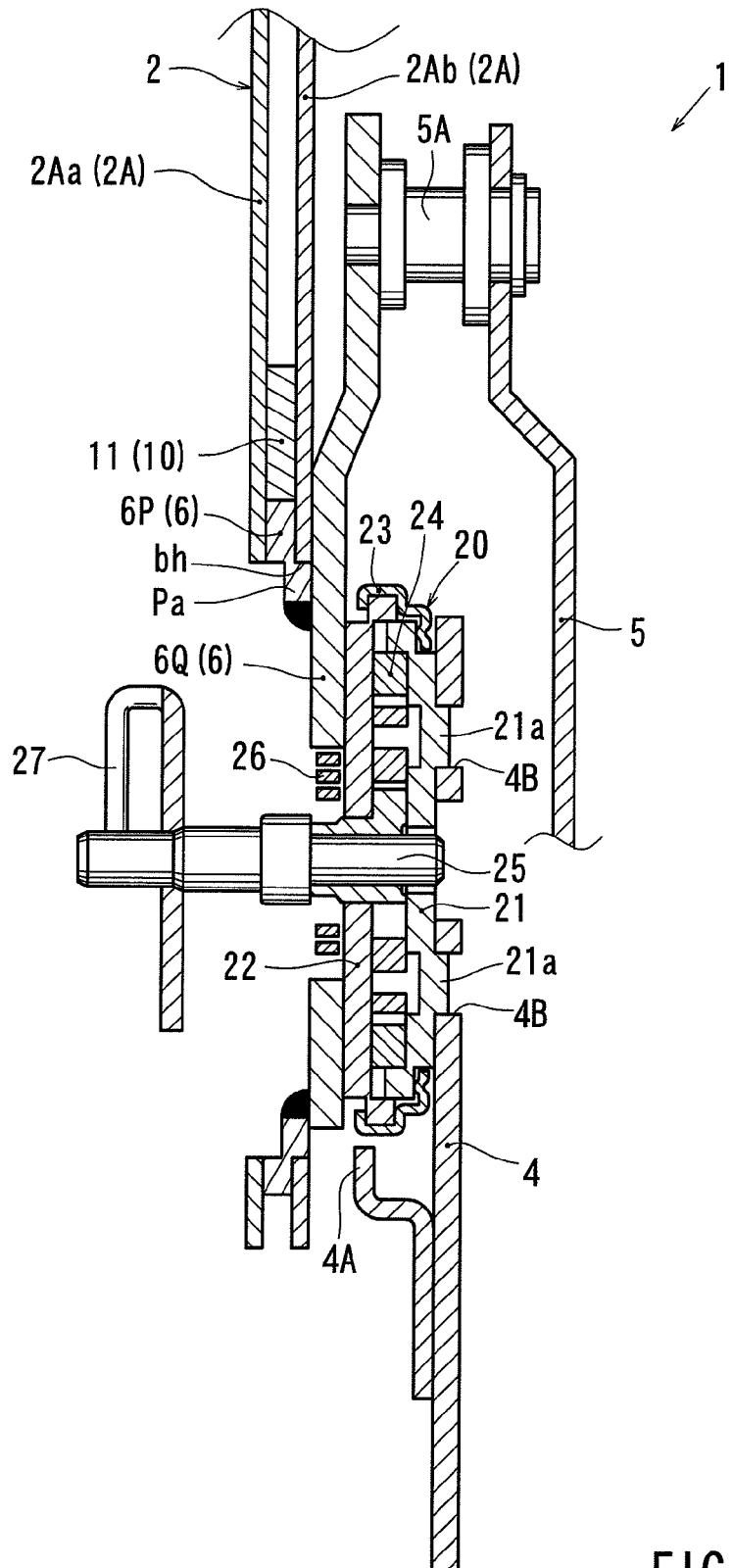
FIG. 10 is a sectional view taken along line X-X of FIG. 4.

As shown in FIG. 10, the inner intermediate member 6P is disposed between the inner side frame 2Aa and the outer side frame 2Ab and is coupled thereto while the projected cylindrical portion Pa is fitted into a through hole bh formed in the outer side frame 2Ab. Thus, the cylindrical portion Pa is held against an inner circumferential surface of the through hole bh, so that the side frame 2A can be rotatably supported by the inner intermediate member 6P.

Now, with reference to FIG. 3 again, the inner intermediate member 6P has a substantially precise circular large through hole Pb that is formed in a central portion thereof so as to penetrate the same in a thickness direction. The through hole Pb has diametrically enlarged portions that are partially formed in circumferentially four portions thereon. Therefore, when a guide 22 of the reclining device 20, which will be hereinafter described, is welded to the outer side frame 2Ab, the through hole Pb can be avoided from interfering with dowels 22a of the guide 22 that are projected beyond the through hole bh of the outer side frame 2Ab.

Formed in an outer circumferential portion of the inner intermediate member 6P are depressed portions Pc that are partially depressed radially inwardly, and a slide ledge Pd that has a circular arc shaped curved outer circumferential surface. The slide ledge Pd defines an outer circumferential surface that gently extends circumferentially from a circumferential end surface of one of the depressed portions Pc. Further, formed in the outer circumferential portion of the inner intermediate member 6P is a stopper Pe that is partially projected radially outwardly. The stopper Pe is formed in a position that is circumferentially spaced from the depressed portions Pc and the slide ledge Pd.

Further, the depressed portions Pc of the inner intermediate member 6P are respectively shaped to be engageable with an engagement/disengagement member 11 of a memory device 10 that is disposed on an outside position in a radial direction thereof and is connected to the side frame 2A. Conversely, as shown in FIG. 10, the outer intermediate member 6Q is held against the cylindrical portion Pa of the inner intermediate member 6P fitted into the through hole bh of the outer side frame 2Ab and is welded thereto. Thus, the outer intermediate member 6Q is integrally connected to the inner intermediate member 6P.

Now, with reference to FIG. 3 again, the outer intermediate member 6Q has a cam hole-shaped large through hole Qa that is formed in a lower portion thereof so as to penetrate the same in a thickness direction. Further, the outer intermediate member 6Q has four precise circular small dowel insertion holes Qb that are positioned around the through hole Qa. Further, formed in an outer circumferential portion of the outer intermediate member 6Q is a stopper Qc that is partially projected radially outwardly and is bent in the thickness direction. Further, the disk-shaped guide 22, a construction element of the reclining device 20, which will be hereinafter described, is integrally fixedly connected to the outer intermediate member 6Q.

In particular, the guide 22 has the four dowels 22a that cylindrically projected from an outer disk surface thereof. The dowels 22a are positioned so as to be fitted into the four dowel insertion holes Qb that are formed in the outer intermediate member 6Q and penetrating therethrough. The dowels 22a are respectively fitted into the dowel insertion holes Qb and fitted portions thereof are bonded by welding. Thus, the guide 22 is securely integrally connected to the outer intermediate member 6Q while it is closely faced thereto (FIG. 10).

In the reclining device 20, a disk-shaped ratchet 21 is positioned opposite to the guide 22 and is relatively rotatably connected thereto. The ratchet 21 is integrally secured to the base member 4. In particular, the ratchet 21 has five dowels 21a that substantially cylindrically projected from an outer disk surface thereof. The dowels 21a are positioned so as to be fitted into five dowel insertion holes 4B that are formed in the base member 4 and penetrating therethrough in a thickness direction. The dowels 21a are respectively fitted into the dowel insertion holes 4B and fitted portions thereof are bonded by welding. Thus, the ratchet 21 is securely integrally connected to the base member 4 while it is closely faced thereto (FIG. 10).

Thus, the reclining device 20 is integrally connected to the outer intermediate member 6Q and the base member 4. As a result, the seat back 2 is connected to the base member 4 via a locking/unlocking operation mechanism of the reclining device 20, so as to be capable of rotating relative thereto and to be capable of being prevented from rotating relative thereto. Further, in the reclining device 20, the ratchet 21 is coupled to the guide 22 while a projected cylindrical portion formed in an outer circumferentially peripheral portion of the ratchet 21 is fitted into a projected cylindrical portion formed in an outer circumferentially peripheral portion of the guide 22. Thus, the ratchet 21 and the guide 22 are connected to each other while they are mutually supported, so as to be relatively rotatable about a center of these cylindrical portions.

The ratchet 21 and the guide 22 are secured to each other by an outer circumferential ring 23 that is attached to outer circumferential portions thereof while straddling the same, so as to be prevented from being axially separated from each other. Further, disposed between the ratchet 21 and the guide 22 is locking components 24 that are capable of locking relative rotation of thereof by meshing therewith. The locking components 24 are normally guided by a guide 22 so as to be capable of moving radially outwardly and inwardly.

Further, the locking components 24 are normally pushed out radially outwardly by a biasing force of a spring member 26 that is disposed between the locking components 24 and the guide 22, thereby meshing outwardly-faced teeth formed in an outer circumferential surface thereof with inwardly-faced teeth formed in an inner circumferential surface of the cylindrical portion of the ratchet 21. As a result, the relative rotation of the ratchet 21 and the guide 22 is locked. Further, upon rotation of an operation shaft 25 that is passed through the ratchet 21 and the guide 22, the locking components 24 are drawn back radially inwardly against the biasing force of the spring member 26, so as to be released from a locked condition in which the locking components 24 engage the inwardly-faced teeth formed of the ratchet 21.

Figure 4:
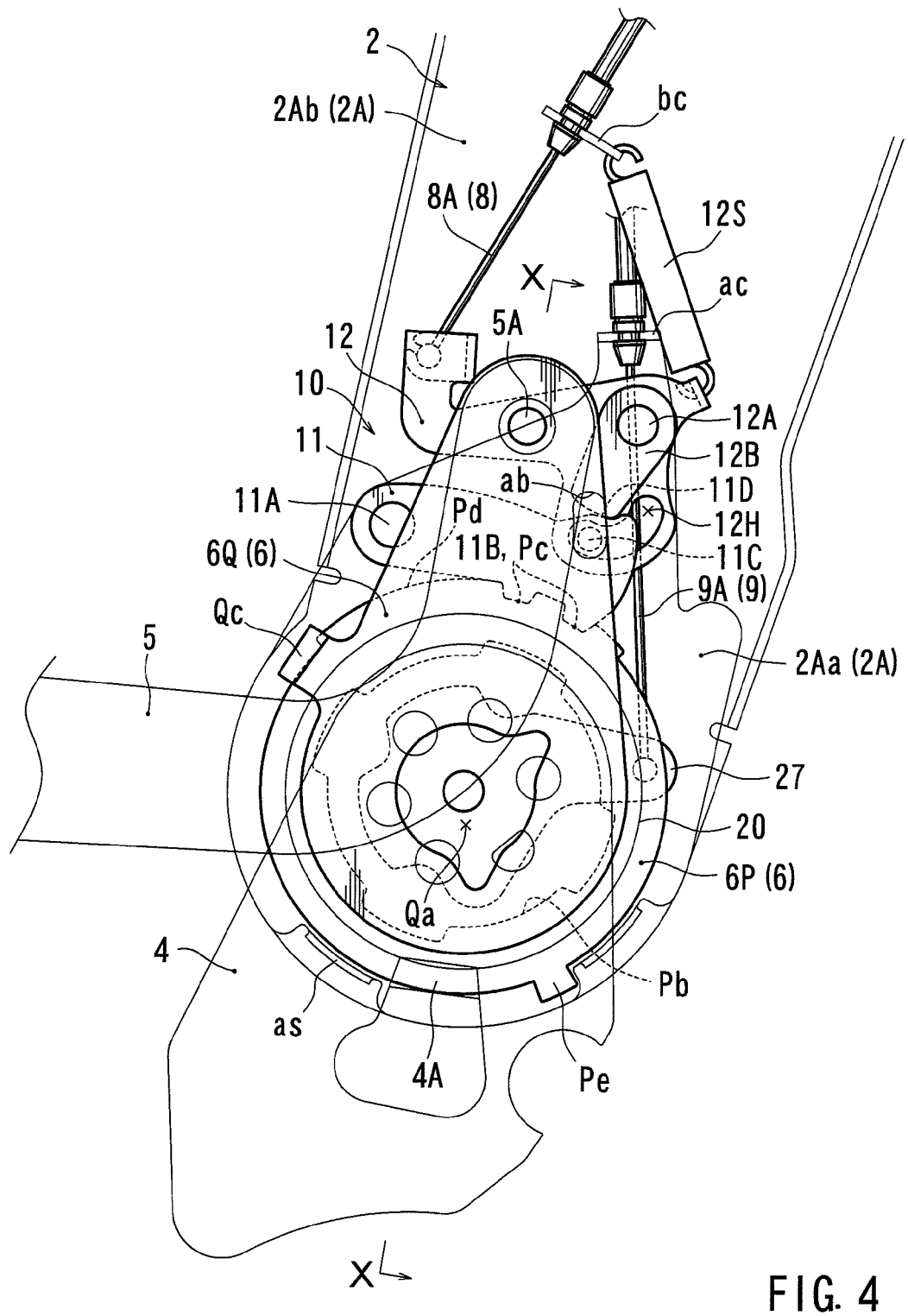
FIG. 4 is an explanatory view, which illustrates a condition in which the seat body is used.

Further, as shown in FIG. 10, the operation shaft 25 that is capable of performing an unlocking operation of the locking components 24 are integrally connected to an operation arm 27 that is connected to the tilt-down operation lever 9 described above via an operation cable 9A. As shown in FIG. 4, the operation cable 9A has a double layer structure in which a line-shaped inner cable is inserted into a tubular outer cable. A lower end portion of the outer cable is engaged with and secured to an engagement portion ac that is formed in the inner side frame 2Aa, and a lower end portion of the inner cable is engaged with and secured to the operation arm 27.

Upon operation of the tilt-down operation lever 9 that is linked to an upper end side of the operation cable 9A, the inner cable of the operation cable 9A is pulled and drawn into the outer cable upwardly, so that the operation arm 27 can be rotated by the inner cable. As a result, the operation shaft 25 is rotated in such a direction in which the engaged and locked condition of the locking components 24 (FIG. 10) can be released. Thus, upon operation of the tilt-down operation lever 9, a locked condition of the reclining device 20 in which it is prevented from rotating can be released.

Therefore, when the reclining device 20 is in the rotationally-locked condition, each of the outer intermediate member 6Q and the inner intermediate member 6P that are previously described with reference to FIG. 3 can be maintained in a condition in which it is prevented from rotating relative to the base member 4. Further, the side frame 2A of the seat back 2 that is rotatably coupled to the inner intermediate member 6P is normally maintained in a condition in which it is prevented from rotating relative to the inner intermediate member 6P because the engagement/disengagement member 11 of the memory device 10 that is connected to the side frame 2A is maintained in a condition in which it enters and engages the depressed portions Pc of the inner intermediate member 6P.

Therefore, when both of the reclining device 20 and the memory device 10 are in the rotationally-locked conditions, the side frame 2A (the seat back 2) is maintained in a condition in which it is prevented from rotating relative to the base member 4 via the intermediate member 6. Further, as shown in FIG. 4, the engagement/disengagement member 11 of the memory device 10 is constructed to be operated by a pusher member 12 that is rotatably connected to the side frame 2A via a shaft, so as to be pushed into and engage the depressed portions Pc of the inner intermediate member 6P or disengaged therefrom.

Figure 7:
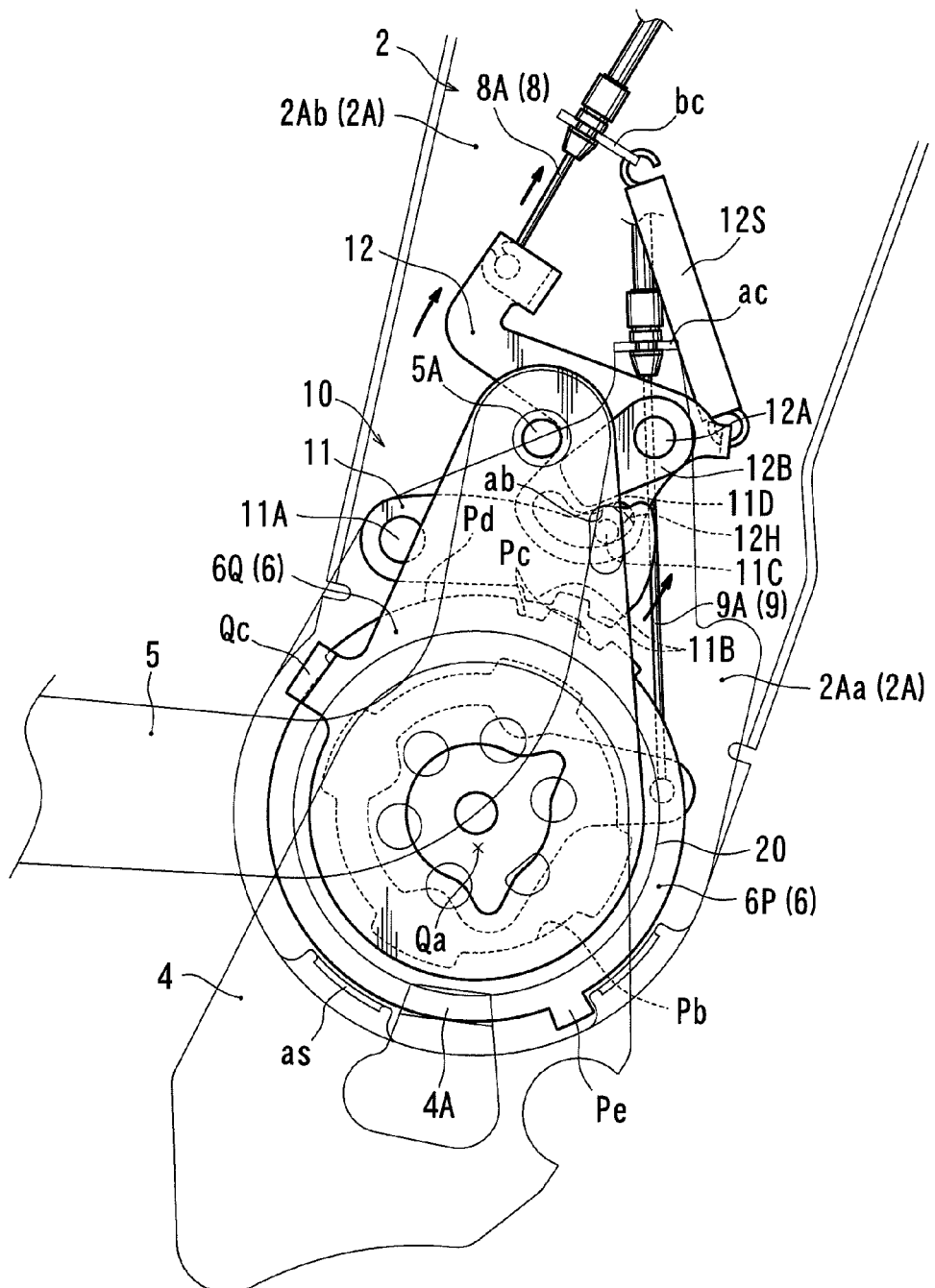
FIG. 7 is an explanatory view, which illustrates a condition in which a walk-in operation of the seat back is performed.

The pusher member 12 is connected to the walk-in operation lever 8 described above via an operation cable 8A. In a normal condition before the walk-in operation lever 8 is operated, the pusher member 12 is maintained in a condition in which it presses the engagement/disengagement member 11 into the depressed portions Pc of the inner intermediate member 6P by biasing and engages the same therewith. Further, as shown in FIG. 7, when the walk-in operation lever 8 is operated such that the operation cable 8A is pulled, the pusher member 12 is rotated so as to disengage the engagement/disengagement member 11 from the depressed portions Pc of the inner intermediate member 6P.

When the engagement/disengagement member 11 is disengaged from the depressed portions Pc of the inner intermediate member 6P, the rotationally-prevented condition of the side frame 2A relative to the inner intermediate member 6P can be released. As a result, the side frame 2A is changed to a condition in which it is capable of rotating relative to the intermediate member 6 that is integrated with the base member 4 via the locked reclining device 20. Further, a center axis line on which the side frame 2A rotates relative to the inner intermediate member 6P is set to be aligned with a rotation center axis line on which the ratchet 21 and the guide 22 of the reclining device 20 rotate relative to each other.

Thus, a rotation center about which the side frame 2A rotates relative to the inner intermediate member 6P corresponds to a rotation center about which the side frame 2A rotates relative to the base member 4 while it is integrated with the intermediate member 6. Further, because a basic structure of the reclining device 20 is known as described in, for example, JP 2002-360368A and JP 2005-312891A, detailed description with regard to the reclining device 20 will be omitted.

Figure 8:
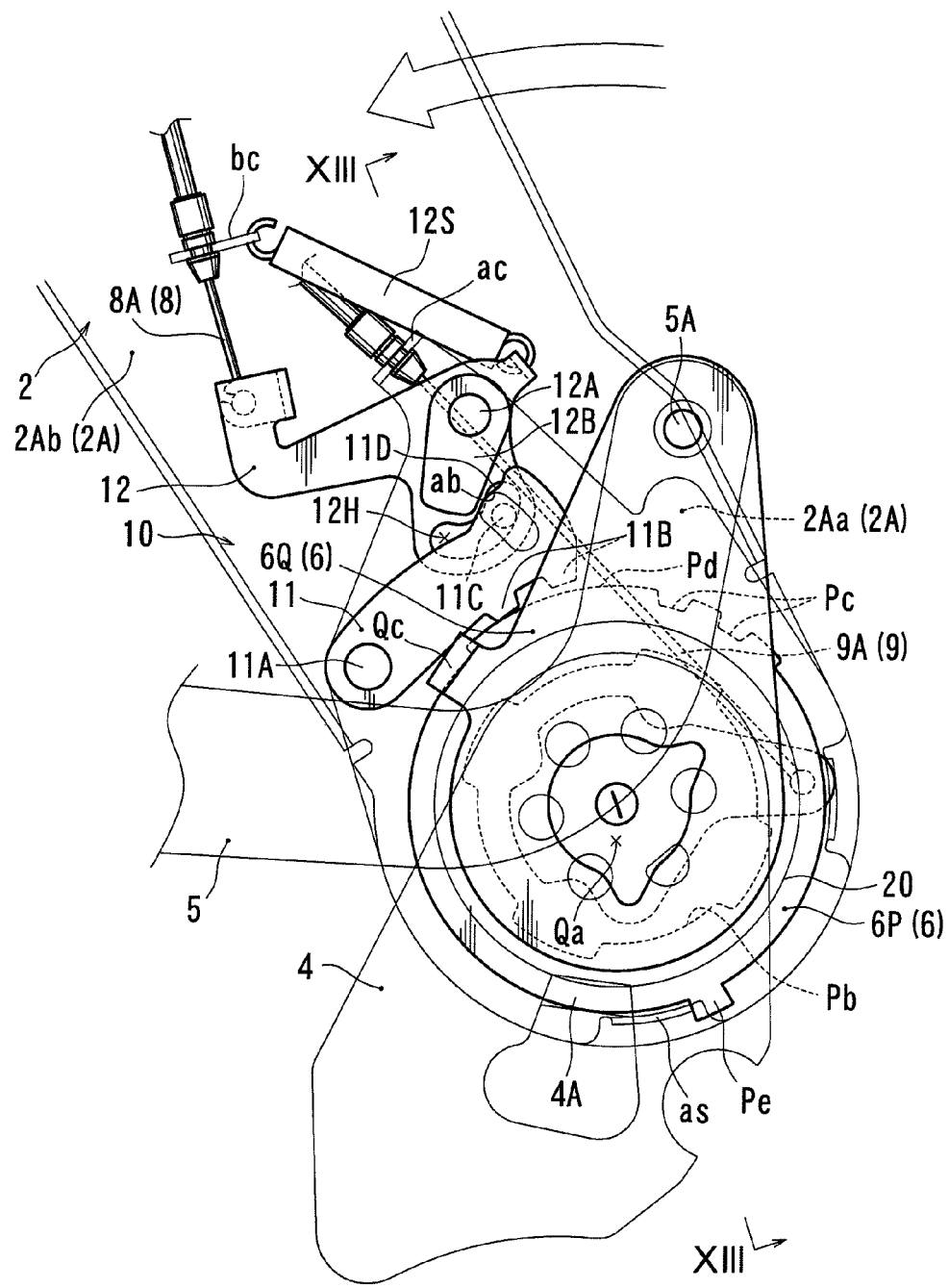
FIG. 8 is an explanatory view, which illustrates a condition in which the seat back is tiltably rotated to a forwardly inclined position.

With reference to FIG. 3 again, the inner side frame 2Aa has a precise circular large through hole ah that is formed in a central portion thereof so as to penetrate the same. Further, formed in an outer circumferential peripheral portion of the inner side frame 2Aa is a stopper as that is partially bent in a thickness direction. As shown in FIG. 8, when the walk-in operation lever 8 is operated such that the side frame 2A (the seat back 2) is tiltably rotated forwardly relative to the intermediate member 6, the stopper as interferes with the stopper Pe that is formed in the inner intermediate member 6P, thereby stopping forwardly tiltable rotation of the side frame 2A at a forwardly inclined position shown in the drawing.

Figure 13:
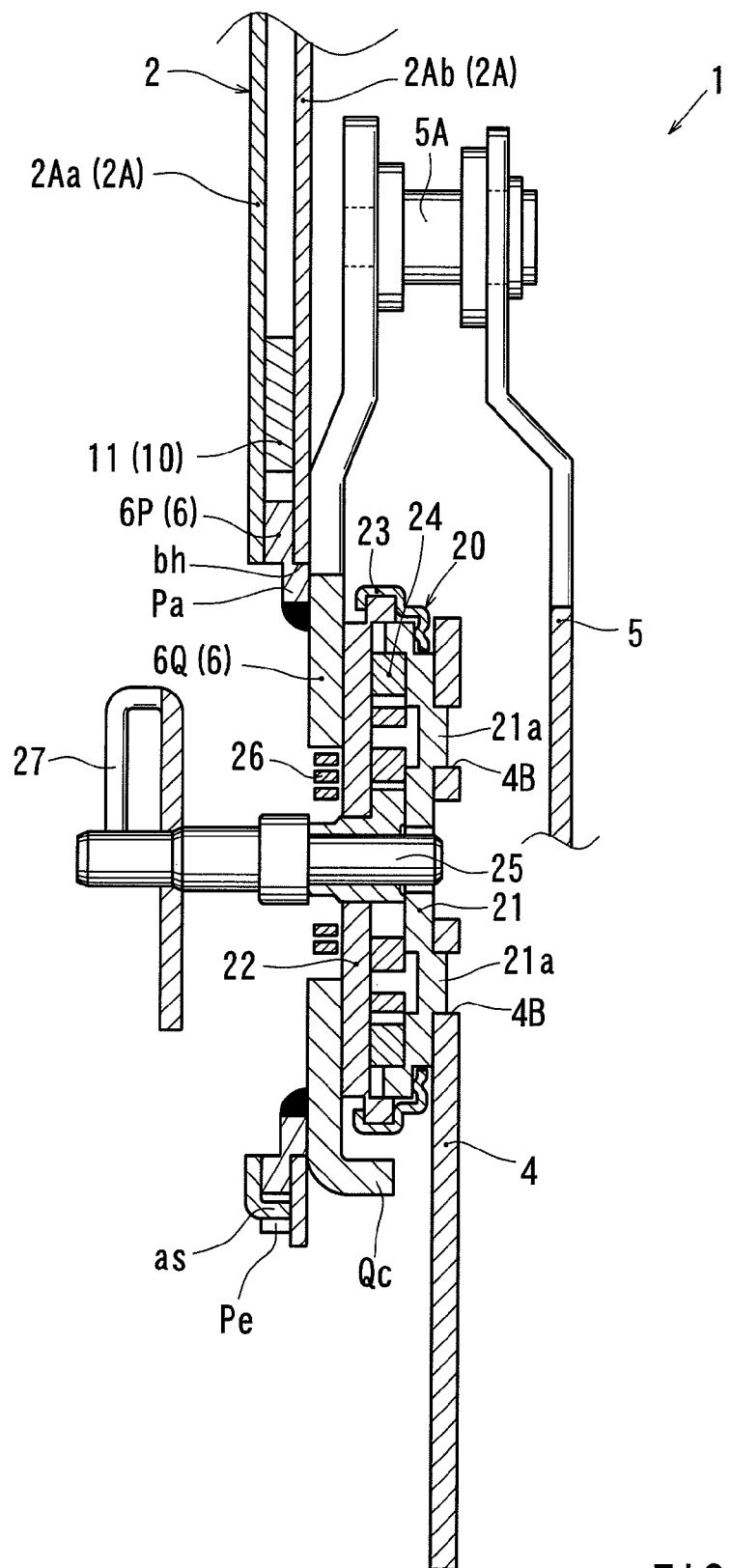
FIG. 13 is a sectional view taken along line XIII-XIII of FIG. 8.
Figure 14:
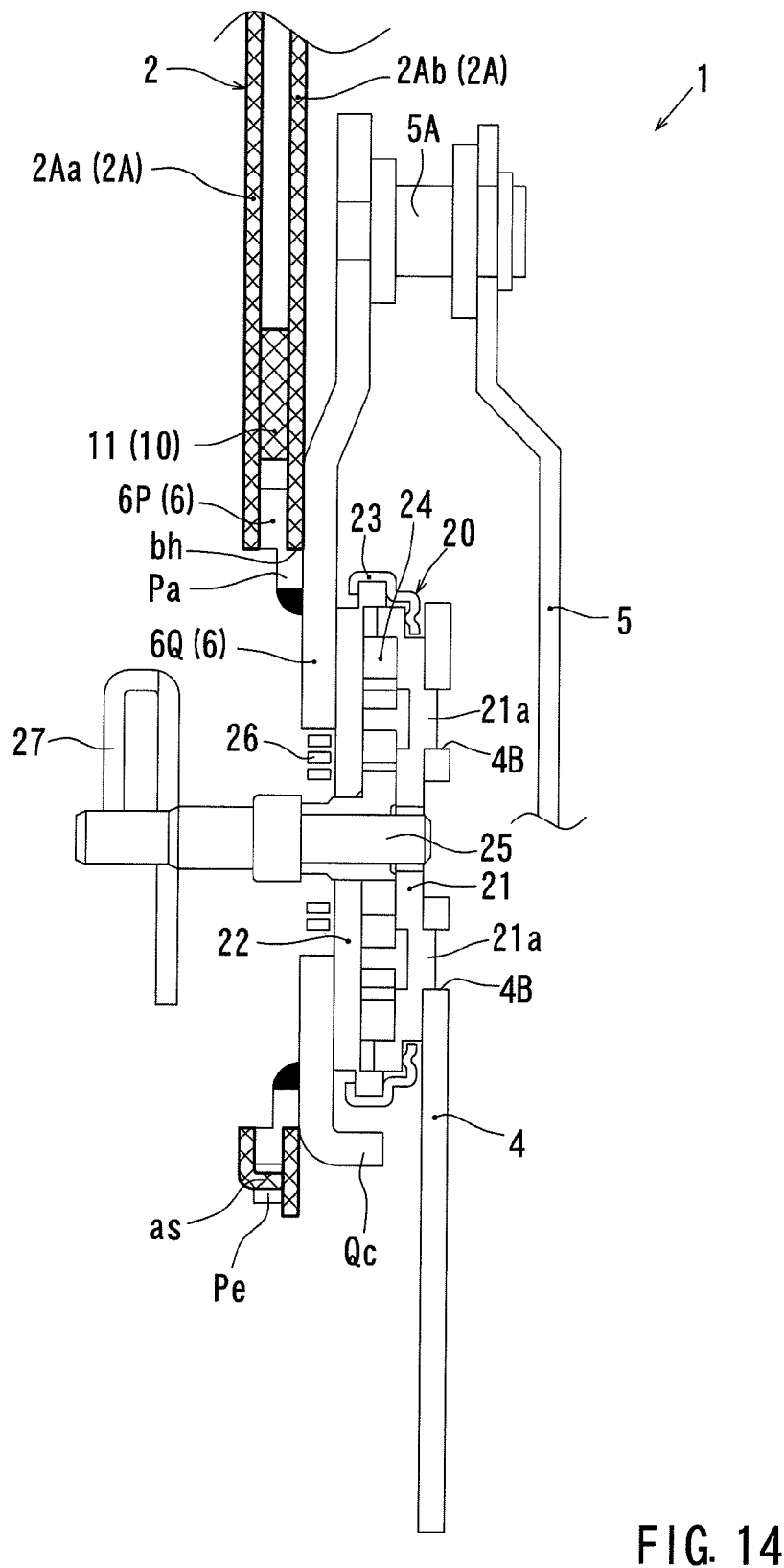
FIG. 14 is an explanatory view corresponding to FIG. 13 in which components capable of moving at the time of the walk-in operation are highlighted.

Further, conditions of the components shown in FIG. 8 are shown in FIG. 13 in detail. Further, FIG. 13 is shown as a sectional view taken along line XIII-XIII of FIG. 8. Further, in FIG. 14, some of the components shown in FIG. 13 are highlighted by cross-hatching. The highlighted components correspond to the components that are capable of moving integrally with the seat back 2 when the seat back 2 is tiltably rotated forwardly to the forwardly inclined position by operation of the walk-in operation lever 8.

Figure 5:
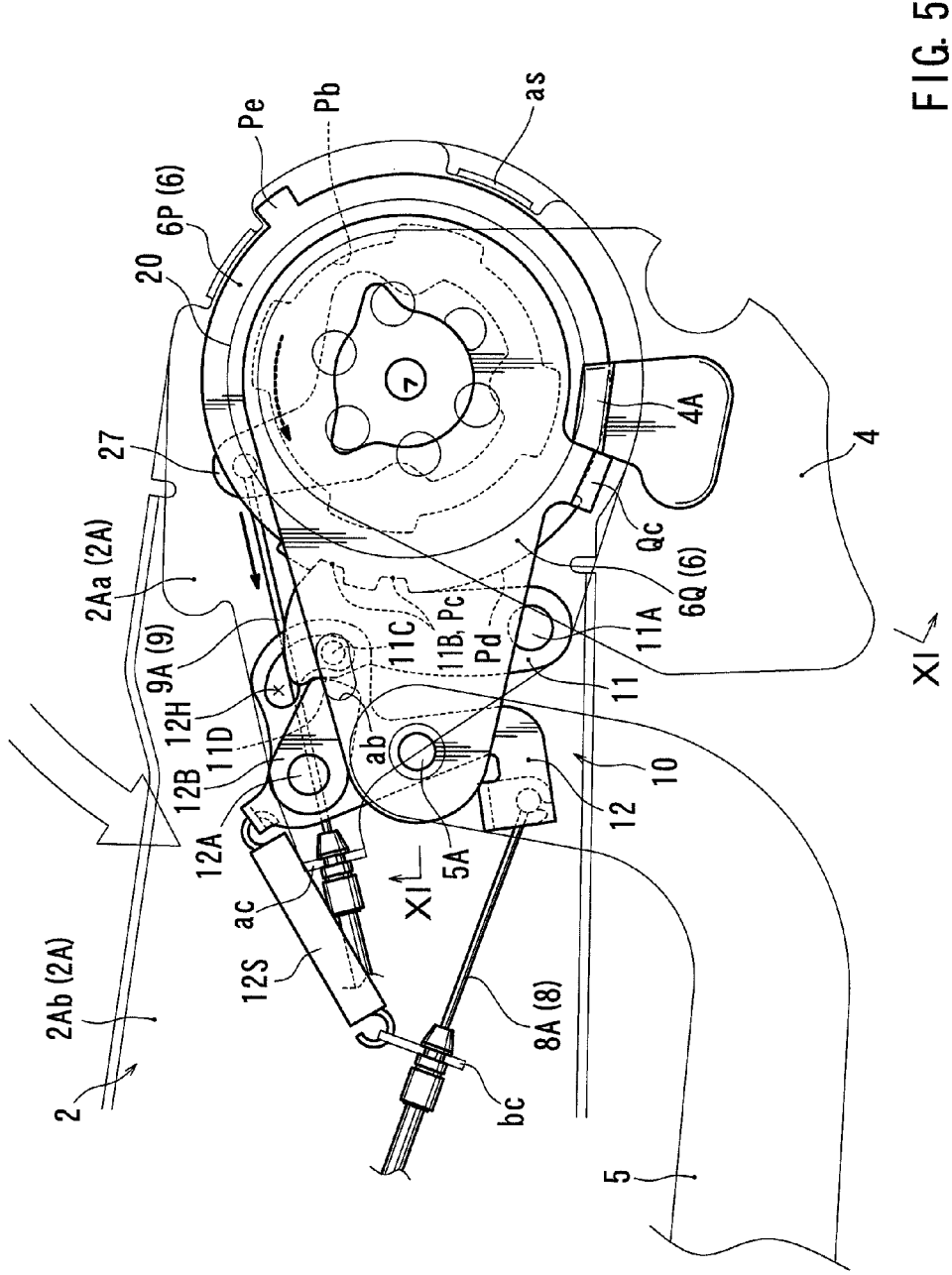
FIG. 5 is an explanatory view, which illustrates a condition in which a tilt-down operation of the seat back is performed.
Figure 11:
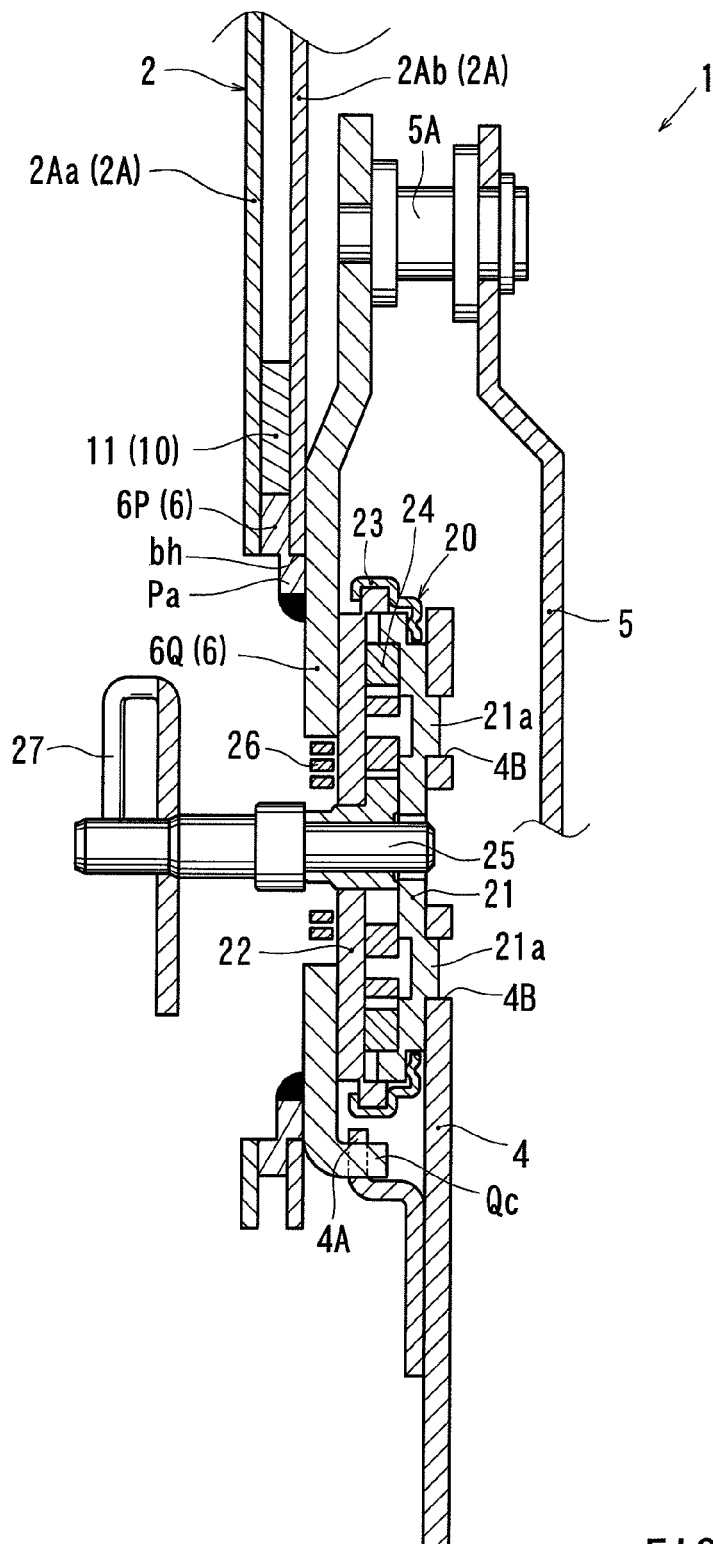
FIG. 11 is a sectional view taken along line XI-XI of FIG. 5.
Figure 12:
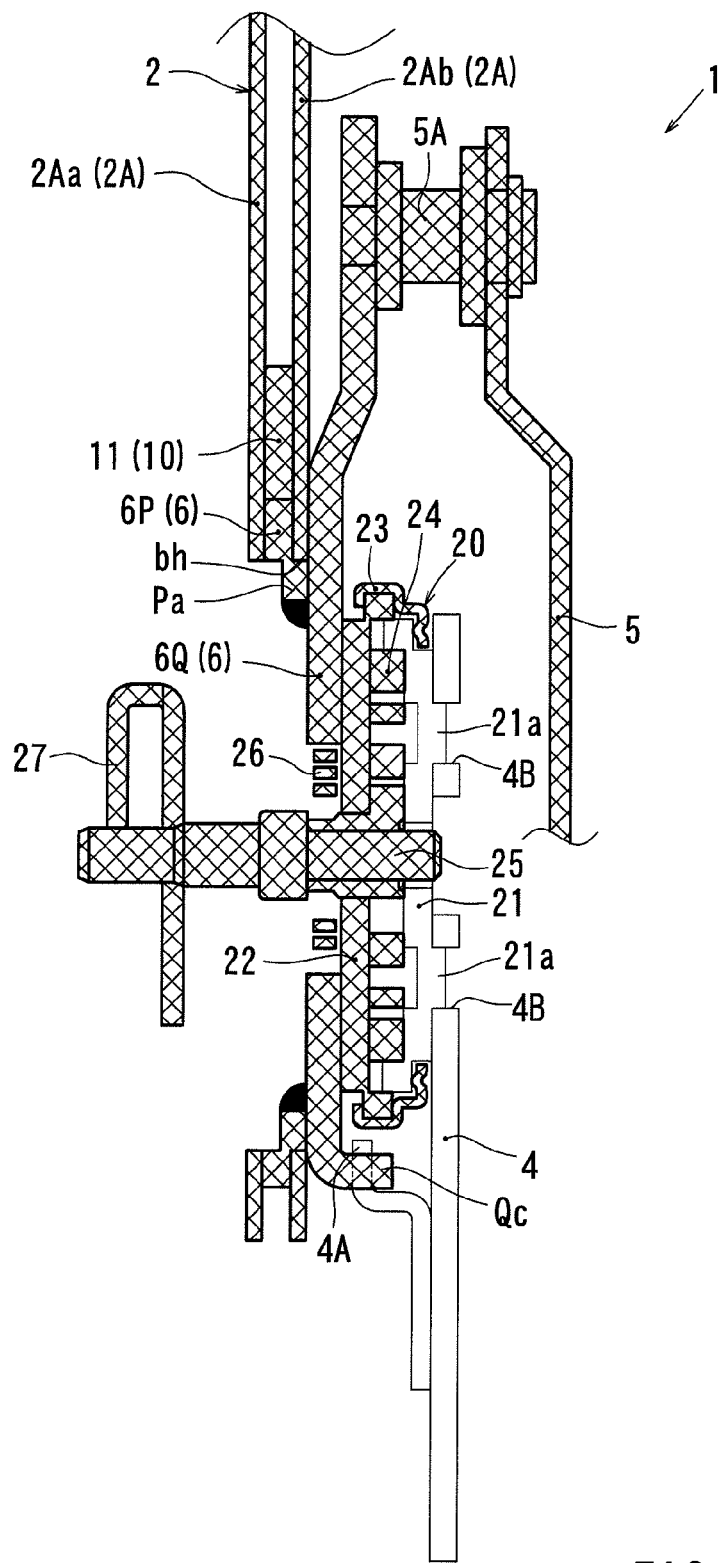
FIG. 12 is an explanatory view corresponding to FIG. 11 in which parts capable of moving at the time of the tilt-down operation are highlighted.

Conversely, as shown in FIG. 5, when the tilt-down operation lever 9 is operated, the stopper Qc that is formed in and projected from the outer circumferential portion of the outer intermediate member 6Q interferes with a stopper 4A that is fixedly attached to the base member 4, thereby stopping the forwardly tiltable rotation of the side frame 2A at a farthest tilted position shown in the drawing. Further, conditions of the components shown in FIG. 5 are shown in FIG. 11 in detail. Further, FIG. 11 is shown as a sectional view taken along line XI-XI of FIG. 5. Further, in FIG. 12, some of the components shown in FIG. 11 are highlighted by cross-hatching. The highlighted components correspond to the components that are capable of moving integrally with the seat back 2 when the seat back 2 is tiltably rotated forwardly to the farthest tilted position by operation of the tilt-down operation lever 9.

Now, with reference to FIG. 2 again, rear upper end portions of L-shaped boomerang links 5 and 5 are rotatably connected to upper end portions of the outer intermediate members 6Q and 6Q via connector pins 5A and 5A. Further, each of the boomerang links 5 and 5 corresponds to a first link. The boomerang links 5 and 5 include forwardly extended arms. End portions of the arms are respectively applied to and integrally rigidly connected to side portions of a frame 3F that constitutes a framework of the seat cushion 3. Thus, the seat cushion 3 is supported on the outer intermediate members 6Q and 6Q from a rear side thereof via the boomerang links 5 and 5.

Further, front side portions of the frame 3F of the seat cushion 3 are respectively rotatably connected to front end portions of the base member 4 via front links 7 and 7 by link coupling. Each of the front links 7 and 7 corresponds to a second link. Upper end portions of the front links 7 and 7 are respectively rotatably connected to the side portions of the frame 3F via shafts. Conversely, lower end portions of the front links 7 and 7 are respectively rotatably connected to side portions of the base member 4 via shafts. Thus, front end portions of the seat cushion 3 are supported on the base member 4 from lower side thereof via the front links 7 and 7.

Therefore, in a normal condition or a condition in which the reclining device 20 and 20 are locked so that the seat back 2 is fixed to a normal angular position for sitting purposes, the seat cushion 3 thus constructed can be maintained in a condition in which each of the front links 7 and 7 is raised, because the outer intermediate members 6Q and 6Q are positionally fixed to the base member 4. Further, as previously described with reference to FIGS. 8 and 9, when the seat back 2 is tilted to the forwardly inclined position by the operation of the walk-in operation lever 8, the seat cushion 3 can be maintained in an initial condition without being substantially moved, because a condition in which the outer intermediate members 6Q and 6Q are positionally fixed to the base member 4 can be maintained.

However, as previously described with reference to FIGS. 5 and 6, when the seat back 2 is tilted forwardly to the farthest tilted position by the operation of the tilt-down operation lever 9, the outer intermediate members 6Q and 6Q are rotated relative to the base member 4, so that the connector pins 5A and 5A supporting the rear upper end portions of the boomerang links 5 and 5 are transferred in the same rotational direction. As a result, the seat cushion 3 can be transferred forwardly and downwardly. Thus, as shown in FIG. 6, the seat cushion 3 can be sunk forwardly and downwardly toward the floor F while rotating the front links 7 and 7 forwardly.

Further, disposed on connecting portions of the front links 7 and 7 and the base member 4 are spring members (not shown) that are capable of biasing the front links 7 and 7 in a rotational direction in which they are raised. Therefore, when the seat cushion 3 is sunk down onto the floor F, downward motion thereof can be dampened by biasing forces of the spring members. Conversely, when the seat cushion 3 is raised up from the floor F, upward motion thereof can be assisted by the biasing forces of the spring members.

Now, with reference to FIG. 2 again, the memory devices 10 and 10 that are capable of preventing the side frames 2A and 2A of the seat back 2 from rotating relative to the inner intermediate members 6P and 6P are respectively disposed on positions between the inner side frames 2Aa and 2Aa and the outer side frames 2Ab and 2Ab. Further, each of the memory devices 10 and 10 corresponds to the other rotation preventing device of the present invention. Further, FIG. 3 shows a structure of the engagement/disengagement member 11 of the memory device 10 positioned at the right side in FIG. 2 as an exploded perspective view. Also, FIG. 4 shows a structure of the pusher member 12 of the memory device 10, which member functions to engage the engagement/disengagement member 11 with the inner intermediate member 6P or disengage the same therefrom.

As shown in these drawings, the engagement/disengagement member 11 is formed to have a link-arm shape and is rotatably connected to the side frame 2A via connector shafts 11A. The engagement/disengagement member 11 has projected portions 11B that are formed in a side surface of a rotational distal end thereof. The projected portions 11B are capable of being fitted into the depressed portions Pc that are formed in the outer circumferential portion of the inner intermediate member 6P. As shown in FIG. 7, when the engagement/disengagement member 11 is rotated about the connector shafts 11A, the projected portions 11B are introduced into and engaged with the depressed portions Pc or disengaged therefrom.

As shown in FIG. 3, the engagement/disengagement member 11 has an engagement pin 11C that is projected in a thickness direction thereof to have a pin shape. The engagement pin 11 C is fitted into an elongated through hole ab that is formed in the inner side frame 2Aa to penetrate therethrough. Thus, the engagement/disengagement member 11 is capable of rotating about the connector shafts 11A within a range that the engagement pin 11C is capable of moving in the elongated through hole ab. Further, as shown in FIG. 4, the link-arm shaped pusher member 12 is disposed between the engagement/disengagement member 11 and the inner side frame 2Aa.

The pusher member 12 is rotatably connected to the side frame 2A via a connector shaft 12A. Further, a pressure cam 12B is integrally connected to the pusher member 12. The pressure cam 12B is capable pushing an upper surface portion (a head surface portion 11D) of the engagement/disengagement member 11 downwardly when the pusher member 12 is rotated counterclockwise. Also, disposed between the pusher member 12 and the outer side frame 2Ab is a tension spring 12S that rotationally biases the pusher member 12 counterclockwise relative to the outer side frame 2Ab.

Therefore, in a normal condition, the pusher member 12 is applied with a rotational force due to a biasing force of the tension spring 12S, so as to push the engagement/disengagement member 11 downwardly via the pressure cam 12B, thereby pressing the engagement/disengagement member 11 onto an outer circumferential surface of the inner intermediate member 6P. Thus, the engagement/disengagement member 11 can be positioned in a condition in which the projected portions 11B formed therein can enter the depressed portions Pc of the inner intermediate member 6P. Consequently, the engagement/disengagement member 11 is positioned in a condition in which it is pressed into the depressed portions Pc due to the pushing force described above while a rear surface portion (the head surface portion 11D) thereof is pushed by the pressure cam 12B, so as to be prevented from being disengaged therefrom.

Thus, the side frame 2A of the seat back 2 can be maintained in a condition in which it is prevented from rotating relative to the intermediate member 6. Further, as shown in FIG. 7, an engagement condition of the engagement/disengagement member 11 with the inner intermediate member 6P can be released when the pusher member 12 is rotated clockwise via the operation cable 8A by the operation of the walk-in operation lever 8.

Further, the operation cable 8A has a double layer structure in which a line-shaped inner cable is inserted into a tubular outer cable. A lower end portion of the outer cable is engaged with and secured to an engagement portion be that is formed in the outer side frame 2Ab, and a lower end portion of the inner cable is engaged with and secured to the pusher member 12. Upon operation of the walk-in operation lever 8 that is linked to an upper end portion of the operation cable 8A, the inner cable is pulled upwardly relative to the outer cable, so as to rotate the pusher member 12 clockwise against the biasing force of the tension spring 12S.

Upon operation thereof, the engagement/disengagement member 11 is rotated counterclockwise about the connector shafts 11A while it is pulled upwardly by the pusher member 12, so that the engagement condition of the engagement/disengagement member 11 with the depressed portions Pc of the inner intermediate member 6P can be released. Further, the pusher member 12 has a curved elongated through hole 12H that 12 12Hthat is formed therein so as to penetrate the same in a thickness direction. The engagement pin 11C projected from the engagement/disengagement member 11 in the thickness direction thereof is inserted into the elongated through hole 1211 while penetrating therethrough.

Thus, the pusher member 12, when rotated clockwise by the motion of the operation cable 8A, acts on the engagement pin 11C so as to pull the same upwardly along the curved shape of the elongated through hole 12H. As a result, the engagement condition of the engagement/disengagement member 11 with the inner intermediate member 6P can be released, so that the rotationally-prevented condition of the seat back 2 relative to the intermediate member 6 can be released.

Therefore, when the seat back 2 is tiltably rotated forwardly relative to the intermediate member 6 from this condition, the seat back 2 is shifted to a condition in which it is tilted to the forwardly inclined position shown in FIG. 8, and is maintained in the condition. At this time, when the operation of the walk-in operation lever 8 is discontinued during the forwardly tiltable rotation of the seat back 2, due to the biasing force of the tension spring 12S applied to the pusher member 12, the engagement/disengagement member 11 can be shifted to a condition in which the projected portions 11B thereof is pressed onto the slide ledge Pd that is formed in the outer circumferential portion of the inner intermediate member 6P.

The outer circumferential surface of the slide ledge Pd has a curved circular arc shape that is centered on a tiltable rotation center of the seat back 2. Therefore, even when the engagement/disengagement member 11 is shifted to a condition in which it is pressed onto the outer circumferential surface of the slide ledge Pd, the engagement/disengagement member 11 can smoothly slide along the curved outer circumferential shape of the slide ledge Pd with the tiltable rotation of the seat back 2. Thus, once the seat back 2 is tilted forwardly even a little by the operation of the walk-in operation lever 8 until the projected portions 11B is positionally displaced relative to the depressed portions Pc, even if the operation of the walk-in operation lever 8 is discontinued in the middle thereof, the seat back 2 can be smoothly tiltably rotated forwardly to the forwardly inclined position shown in FIG. 8.

Further, the engagement/disengagement member 11 described above can be maintained in a condition in which it is disposed on the slide ledge Pd even when the seat back 2 is shifted to the condition in which it is tilted to the forwardly inclined position. Therefore, the seat back 2 can be returned to the normal angular position before it is tilted forwardly by simply raising the seat back 2 to a position in which the projected portions 11B can fit into the depressed portions Pc without operating the walk-in operation lever 8 again.

That is, the memory device 10 is constructed to function as a normal angle memory device that is capable of memorizing a normal angle before the seat back 2 is tilted forwardly by the operation of the walk-in operation lever 8, and returning the seat back 2 to the normal angular position before the seat back 2 is tilted forwardly by simply raising the seat back 2 toward the normal angular position after a walk-in operation is performed.

Further, with reference to FIG. 2, the operation cable 9A connected to the tilt-down operation lever 9 has a cable structure that is intermediately-branched to two portions. The branched portions are respectively connected to the operation arms 27 and 27 that are connected to the reclining devices 20 and 20. Conversely, the operation cable 8A connected to the walk-in operation lever 8 has a cable structure that is intermediately-branched to two portions. Each of the branched portions is connected to the pusher member 12 of each of the memory devices 10 and 10 that are respectively disposed in the side frames 2A.

Further, with reference to FIG. 2, projecting surfaces aa and projecting surfaces ba are respectively formed in the inner side frame 2Aa and the outer side frame 2Ab, so as to project from plate surfaces thereof in a line shape. The projecting surfaces aa and the projecting surfaces ba are respectively formed in portions that face the inner intermediate member 6P and the engagement/disengagement member 11 in a thickness direction thereof. Thus, the inner intermediate member 6P and the engagement/disengagement member 11 can contact the inner side frame 2Aa and the outer side frame 2Ab with reduced areas, so that frictional resistance produced therebetween caused by sliding motion thereof can be reduced. As a result, the inner intermediate member 6P and the engagement/disengagement member 11 can rotate smoothly.

Figure 15:
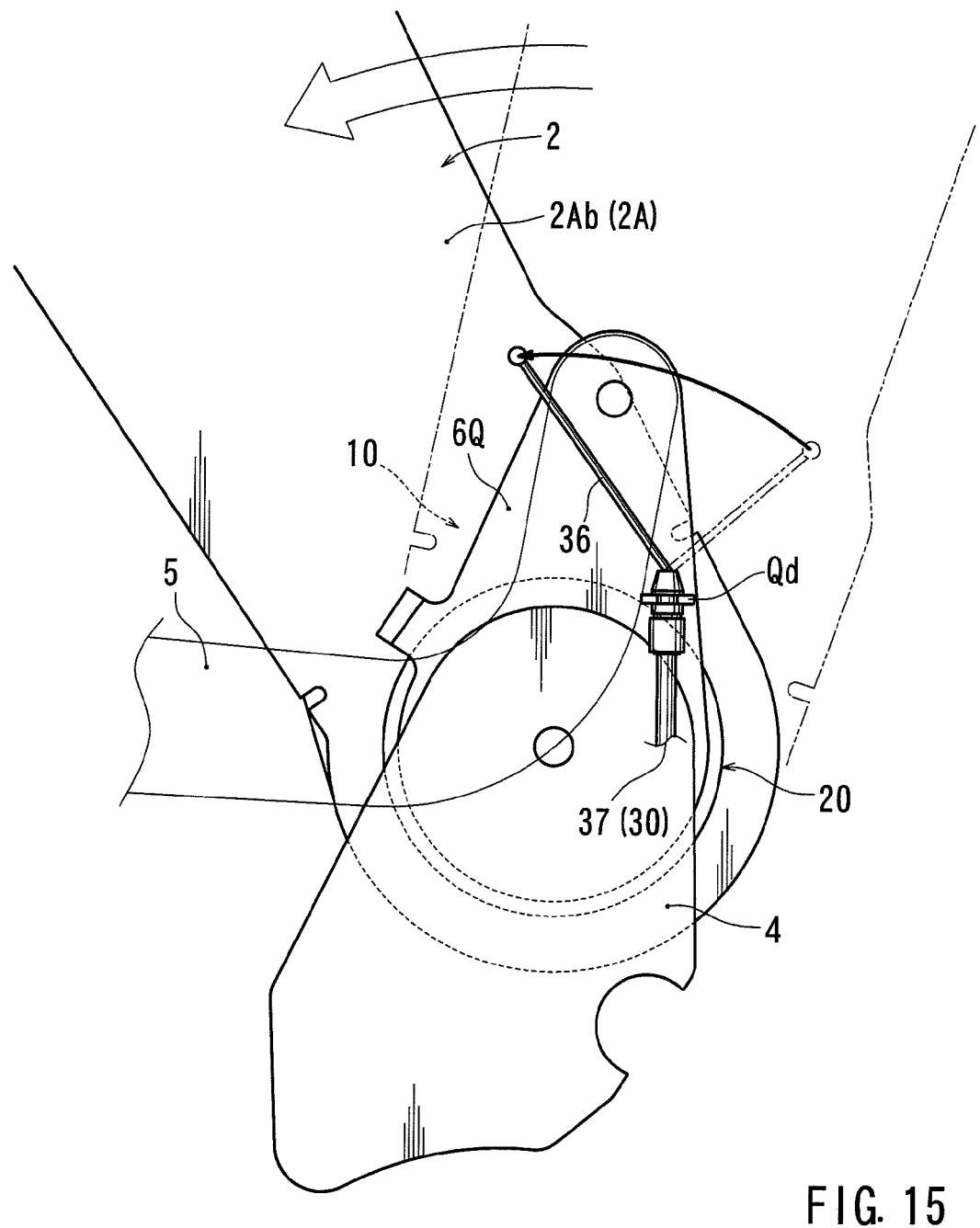
FIG. 15 is an explanatory view, which illustrates a mechanism for releasing a locked condition of a slider device at the time of the walk-in operation.

Now, as shown in FIG. 15, when the seat back 2 is tilted forwardly by the operation of the walk-in operation lever 8, the locking condition of the slide lock mechanism 37 that locks the seat body 1 so as to not slide relative to the floor F can be released. In particular, connected to the slide lock mechanism 37 is an operation cable 36 that is capable of performing an unlocking operation of the slide lock mechanism 37.

The operation cable 36 has a double layer structure in which a line-shaped inner cable is inserted into a tubular outer cable. An upper end portion of the outer cable shown in the drawing is engaged with and secured to an engagement portion Qd that is formed in the outer intermediate member 6Q, and an upper end portion of the inner cable is engaged with and secured to the outer side frame 2Ab. Further, when the seat back 2 is tiltably rotated forwardly relative to the intermediate member 6 by the operation of the walk-in operation lever 8, the inner cable of the operation cable 36 is pulled upwardly relative to the outer cable, so that the slide-locking condition of the slide lock mechanism 37 can be released.

As shown in FIGS. 1 to 2, disposed between one lower rail 31 of the slider device 30 and the base member 4 is a tension spring 34 that biases the base member 4 to move the same forwardly in the vehicle longitudinal direction. Front end portion of the tension spring 34 is connected to a spring engagement portion 35 that is fixed to a front portion of the lower rail 31. Conversely, rear end portion of the tension spring 34 is connected to a spring engagement portion 4S that is formed in both side portions of the base member 4. Therefore, the seat body 1 can be moved forwardly in the vehicle longitudinal direction by a biasing force of the tension spring 34 in conjunction with the motion in which the seat back 2 is tilted to the forwardly inclined position by the operation of the walk-in operation lever 8.

Thus, according to the vehicle seat of the present embodiment, the seat cushion 3 is connected to the intermediate member 6 via the boomerang link 5, so as to be sunk downwardly in conjunction with the motion in which the intermediate member 6 rotates with the seat back 2 when the tilt-down function is performed. However, when the walk-in function is performed, the seat back 2 is tiltably rotated forwardly independently of the intermediate member 6 while the intermediate member 6 is maintained in a condition in which it is integrated with the base member 4.

Therefore, in this case, because the seat cushion 3 cannot be moved, a retracting space which allows the seat body 1 to slide forwardly can be maintained without being narrowed. Thus, because the seat cushion 3 cannot be moved when the walk-in function is performed, a wider retracting space which allows the seat body 1 to move forwardly can be obtained in comparison with a structure in which the seat cushion 3 can be moved forwardly as when a tilt-down operation is performed.

Further, in the memory device 10 that connects the seat back 2 to the intermediate member 6 while the seat back 2 can be maintained in the condition in which it is prevented from rotating relative to the intermediate member 6, the engagement/disengagement member 11 connected to the seat back 2 is radially aligned with the depressed portions Pc formed in an outer circumferential peripheral portion of the intermediate member 6, so as to enter the depressed portions Pc from outside in the radial direction or to be disengaged therefrom. Therefore, the memory device 10 can be compactly disposed in a direction of a rotational axis thereof.

When the engagement/disengagement member 11 is in the engagement condition in which it enters the depressed portions Pc of the intermediate member 6, the pusher member 12 of the memory device 10 that is rotatably attached to the seat back 2 pushes the engagement/disengagement member 11 from a rear surface side thereof by rotational biasing. As a result, the engagement/disengagement member 11 is positioned in a condition in which it is pressed into the depressed portions Pc of the intermediate member 6, so as to be prevented from being disengaged therefrom. Thus, an engagement strength between the engagement/disengagement member 11 and the intermediate member 6 can be increased, so that a rotation preventing strength of the memory device 10 can be increased.

The engagement/disengagement member 11, that is disengaged from the depressed portions Pc of the intermediate member 6 as a result of performance of the walk-in function, can slide along a curved outer circumferential surface portion (the slide ledge Pd) of the intermediate member 6 as the seat back 2 is tiltably rotated. Therefore, even if the engagement/disengagement member 11 is not maintained in a condition in which it is spaced from the outer circumferential surface portion of the intermediate member 6, i.e., even if the operation of the walk-in operation lever 8 is discontinued in the middle thereof, the engagement/disengagement member 11 can smoothly move as the seat back 2 is tiltably rotated.

The present invention has been described using one embodiment. However, various changes and modifications may be made to the present invention. For example, in the embodiment, the engagement/disengagement member 11 of the memory device 10 constituting the other rotation preventing device is capable of being engaged with or disengaged from the depressed portions Pc of the intermediate member 6 by rotational motion. However, the engagement/disengagement member 11 can be modified so as to be capable of being engaged with or disengaged from the depressed portions Pc by linear motion or other such motion. Further, the engagement structure between the engagement/disengagement member 11 and the intermediate member 6 can be formed by a tooth-meshing engagement or a frictional engagement.

Further, in the embodiment, when the seat back 2 is tiltably rotated forwardly by the operation of the walk-in operation lever 8, the slide locking condition of the slider device 30 can be released, so that the seat body 1 can be automatically moved forwardly in the vehicle longitudinal direction by the biasing force of the tension spring 34. However, the walk-in function of the present invention may include a type in which the slide locking condition can be released by manual operation after the seat back 2 is tilted to the forwardly inclined position and a type in which the seat body 1 can be manually moved forwardly after the seat back 2 is tilted to the forwardly inclined position.

The invention claimed is:

1. A vehicle seat having a tilt-down function to sink down a seat cushion in conjunction with farthest tilting motion in which a seat back is tilted down forwardly and having a walk-in function to make a condition in which a seat body is capable of sliding forwardly relative to a vehicle floor in conjunction with half tilting motion in which the seat back is tilted to a forwardly inclined position, wherein the seat back is connected to a base member, that is slidably disposed on a vehicle floor, via first and second rotation preventing devices while an intermediate member is interleaved threrebetween, so as to be capable of rotating relative to both of the intermediate member and the base member about a common axis and to be capable of being prevented from rotating relative thereto, and wherein a first link integrally connected to the seat cushion is rotatably connected to the intermediate member via a shaft, wherein a second link is disposed between the seat cushion and the base member in order to rotatably connect the same by link coupling, wherein when the tilt-down function is performed, a rotationally-preventing condition of one rotation preventing device connecting the base member and the intermediate member is released, so that the seat back is tiltably rotated forwardly integrally with the intermediate member and that the seat cushion is pushed by the first link capable of moving with the intermediate member so as to be sunk downwardly while tiltably rotating the second link, whereas when the walk-in function is performed, a rotationally-preventing condition of the other rotation preventing device connecting the seat back and the intermediate member is released, so that the seat back can be tiltably rotated to the forwardly inclined position independently of the intermediate member that is maintained in a condition in which the intermediate member is integrated with the base member, further wherein the other rotation preventing device, that is capable of being released when the walk-in function is performed, is disposed on an outside position of the intermediate member in a radial direction thereof, so as to prevent the seat back from rotating relative to the intermediate member when an engagement/disengagement member connected to the seat back enters and engage a depressed portion formed in an outer circumferential peripheral portion of the intermediate member from outside in the radial direction.

2. The vehicle seat as defined in claim 1, wherein the engagement/disengagement member constituting the other rotation preventing device is arranged to be capable of moving toward and away from the seat back and is capable of being engaged with and disengaged from the depressed portion of the intermediate member, and wherein when the engagement/disengagement member is positioned in an engagement condition in which the engagement/disengagement member enters the depressed portion of the inner intermediate member, a pusher member rotatably connected to the seat back is pressed onto a rear surface of the engagement/disengagement member by biasing, so that the engagement/disengagement member can be pressed into the depressed portions of the inner intermediate member and can be prevented from being disengaged therefrom.

3. The vehicle seat as defined in claim 2, wherein when the walk-in function is performed, the engagement condition of the engagement/disengagement member with the depressed portion of the inner intermediate member can be released, so that the disengaged engagement/disengagement member can slide along a curved outer circumferential surface portion of the intermediate member as the seat back is tiltably rotated, and wherein as the seat back is raised from the forwardly inclined position, the engagement/disengagement member can be returned to a position in which the engagement/disengagement member is capable of entering the depressed portion of the inner intermediate member, so as to enter the depressed portion of the intermediate member while being pressed from a rear surface side thereof by the pusher member, thereby being shifted to the engagement condition.

* * * * *